United States Patent [19]

Belloc et al.

[11] 3,766,480

[45] Oct. 16, 1973

[54] DEVICE FOR RECOVERING A FREQUENCY SHOWING PHASE JITTER

[75] Inventors: Jacques Belloc, Fontonne Antibes; Michel Francois Choquet, Vence; Jean Marc Pierret, Nice, all of France

[73] Assignee: International Business Machines Corporation, Armonk, N.Y.

[22] Filed: Jan. 19, 1972

[21] Appl. No.: 218,963

[30] Foreign Application Priority Data

Jan. 21, 1971 France .............................. 7102568

[52] U.S. Cl. .................... 325/320, 178/88, 329/110

[51] Int. Cl. ............................................ H04l 27/22

[58] Field of Search ...................... 178/66 R, 67, 88; 325/320; 329/110

[56] References Cited

UNITED STATES PATENTS 3,349,329 10/1967 Crafts .................................. 178/88

*Primary Examiner*—Malcolm A. Morrison
*Assistant Examiner*—R. Stephen Dildine, Jr.
*Attorney*—Robert B. Brodie et al.

[57] ABSTRACT

Frequency shift and phase jitter impressed on angle modulated signal spectra during long distance transmission is eliminated at the receiver where the data spectra exclusive of the harmonically related pilot frequencies is time and phase delayed by a discrete amount in a data recovery path. At the same time, a demodulation frequency is extracted from the signal spectrum in a carrier recovery path, the demodulation frequency being the sum of the pilot frequencies. Relatedly, the demodulation frequency is time and phase delayed in the carrier recovery path by an amount equal to that of the data path. Demodulation of the data spectra thus subtractively eliminates the frequency shift and jitter components.

7 Claims, 6 Drawing Figures

PATENTED OCT 16 1973

3,766,480

SHEET 1 OF 3

PATENTED OCT 16 1973 3,766,480

SHEET 2 OF 3

DEVICE FOR RECOVERING A FREQUENCY SHOWING PHASE JITTER

BACKGROUND OF THE INVENTION

This invention relates to modulated carrier wave communications systems in general and to suppressed carrier wave systems in particular.

It is well-known that accurate demodulation of a modulated information signal requires a local carrier of precisely controlled frequency and phase relative to the information signal. During transmission, the information signal is often subjected to numerous impairments including frequency translation. The static component of frequency translation is often called frequency shift and the dynamic portion of frequency translation is often referred to as phase jitter.

A classic method of dealing with frequency translation in single sideband systems is to transmit a pilot signal at the carrier frequency which is separated from the data spectrum by a narrow band-pass filter. The carrier recovered from this pilot has the desired frequency offset. Because of the proximity of the carrier frequency to the modulated signal spectrum, it is difficult to provide adequate bandwidth to permit tracking of the phase jitter because a narrow band-pass filter must be used to separate the pilot from the data spectrum. This classic method will not work at all for vestigial sideband systems because in such systems the data spectrum overlaps the carrier frequency.

Since the dynamic phase distrubances characterized as phase jitter induce equal and synchronous phase deviations into all spectrum components transmitted through the communications medium, they may be communicated to the receiver by any conveient frequency within the transmission band. The most commonly proposed solution to the phase jitter problem is to design the pilot isolation filter or phase locked oscillator to have adequate bandwidth to allow the recovered pilot signal to faithfully reproduce the phase modulation impressed upon the transmitted pilot signal and thereby recover the phase jitter. This second method is based on the assumption that negilibible phase shift will be intorduced into the phase jitter components below 120 Hz of the receeved pilot. In practice, large phase shifts are introduced into the phase jitter components by the phase locked oscillator and by the pilot isolation filter as the carrier is being recovered. The phase shift intorudced into the phase jitter components by the pilot recovery circuits distorts the desired phase jitter information and in some instances, it can cause the effective phase jitter at the demodulator to exceed the original phase jitter introduced by the transmission medium.

SUMMARY OF THE INVENTION

It is an object of this invention to generate an improved demodulation carrier which will demodulate any modulated signal having phase jitter, including vestigial sideband signals as well as single sideband signals.

It is a still further object of this invention to generate a demodulation carrier signal which faithfully tracks phase jitter introduced by the transmission medium with negligible phase shift and which is not sensitive to interference introduced by the modulated signal spectrum components.

The foregoing objects are satisfied by an embodiment of a receiver of phase modulated signals in which each signal as received has its spectral components frequency shifted by S hertz and phase jitter time modulated by $\Delta\phi(t)$ radians. Each signal spectrum includes harmonically related pilot frequencies $f_1$ and $f_2$ lying outside the data frequency band $f$, where $f_2 = nf_1$.

The invention contemplates applying each signal simultaneously to a pair of parallel signal processing paths and then using the frequency output of one path to demodulate the frequency output of the other. Accordingly, a first signal path responsive to the received data frequency band $f + s + K\Delta\phi(t)$, K being a constant, time and phase dealys each frequency by $\tau$ seconds and $\phi$ radians. The data band becomes $f + s + K_1\Delta\phi(t-96) + K_2\phi$, $K_1$ and $K_2$ being constants. A second signal processing path extracts a demodulation frequency from the sum of pilot frequencies $f_1$ and $f_2$. It should be observed that each pilot frequency has been frequency shifted and jittered by an amount $s + K\Delta\phi(t)$. The demodulation frequency would become $f_1 + f_2 + 2S + 2\Delta\phi(t)$.

It is an aspect of this invention that a jitter free and frequency shift free signal $f_1'$ is first obtained according to the relation $$f_1' = [f_2 + s + K\Delta\phi(t) - f_1 + s + K_1\Delta\phi(t)]/(n-1)$$

Next, the demodulation frequency is attained by summing $f_2 + s = K\Delta\phi + f_1'$. By suitably time and phase delaying this frequency by an amount $\tau$ seconds and $\phi$ radians, the expression then becomes $f_1' + f_2 + s + K_1 \Delta\phi(t-\tau) + K_2\phi$. As is apparent, the frequency shift and phase jitter components are subtractively eliminated upon the demodulation of the data frequency band $f + s + K_1\Delta\phi(t-\tau) + K_2\phi$ and filtering the difference frequency thereof, i.e., $f-(f_1' + f_2)$.

DESCRIPTION OF THE PREFERRED EMBODIMENT

Figure 1A:
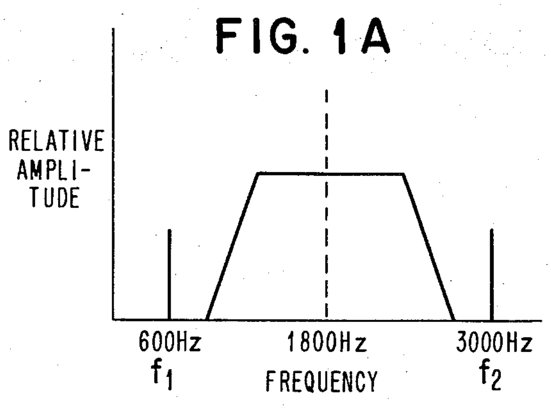
FIG. 1A depicts the relative magnitude versus frequency characteristic of a typical received signal with pilot frequencies.
Figure 1B:
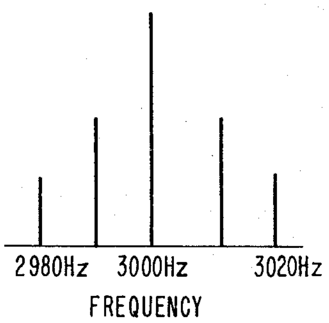
FIG. 1B shows a spectrum of a pilot frequency.
Figure 1C:
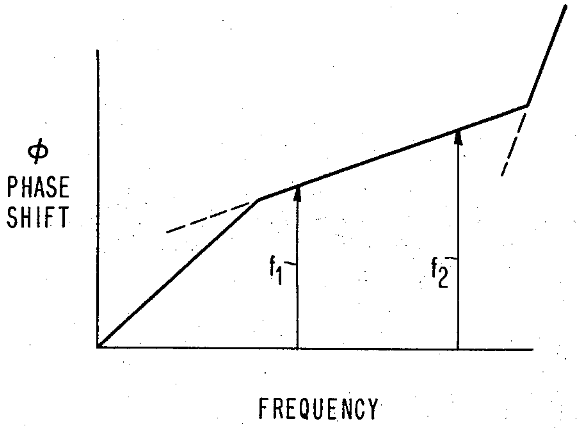
FIG. 1C exhibits the desired linear phase shift vs. frequency characteristics for the phase shift and time delay element 16 used in the carrier recovery path of the embodiment of FIG. 2 and detailed in FIG. 4A.

Referring now to FIG. 1A of the drawings, there is shown the spectral characteristics of a signal. The specrum comprises a pair of harmonically related pilot frequencies 600 Hz and 3000 Hz lying outside the data frequency band. The signal is suitable for transmission on a voice grade telephone channel having a pass band between on or about 100 Hz to on or about 3100 Hz. The pilot tones, while sharply depicted in this figure, actually have a small narrow spectrum of their own as set forth in FIG. 1B. In an apparatus that has for one of its objects the elimination or reduction of frequency and phase sensitive transmission impairments premised upon the cancellation of such impairments by carefully preserving their time, frequency, and phase relationships in parallel paths prior to demodulation, then it becomes desirable to carefully regulate the phase of the signal in one of the paths relative to the other in order to maintian synchrony. Accordingly, a phase shift-time delay element 16 having a linear phase-frequency characteristic as shown in FIG. 1C and inserted in the carrier recovery path of FIG. 2. The range of linearity of the characteristic is determined by the pilot tones $f_1$ and $f_2$ transmitted with the suppressed carrier modulated signal.

Figure 2:
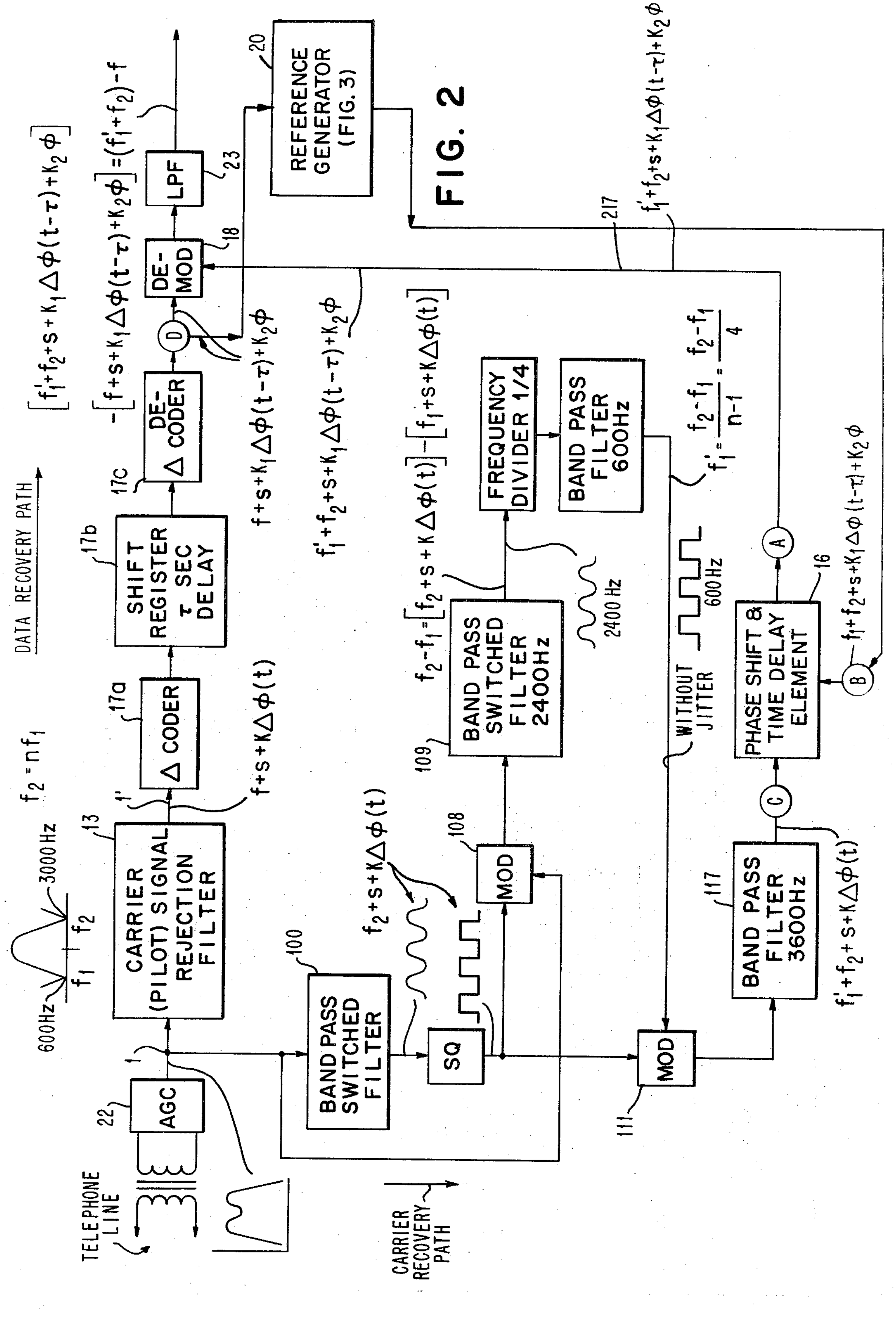
FIG. 2 sets forth a block diagram of the phase and frequency jitter cancellation apparatus of the invention emphasizing the frequency shift, phase and time delays of the suppressed carrier modulated signal in the receiver data recovery path and the carrier as reassembled from pilot tones transmitted just outside the channel spectrum in the carrier recovery path, the transmission impairments being cancelled at the demodulator 18.

Referring to FIG. 2, there is depicted a block diagram embodiment of the invention. The receiver is responsive to for example, a four phase, four level digital echo modulation encoded waveform. Any phase modulated waveform, however, would be sufficient. The waveform is applied through the telephone line and automatic gain control circuit 22 to a pair of signal processing paths simultaneously. The first path, also denominated the "data recovery path, " includes in series a pilot signal rejection filter 13 and a time and phase delay element 17*a*, *b*, *c*. The second path is denominated the "carrier recovery path."

The signal obtained from AGC 22 is applied directly to filter 13. This filter has a band-pass characteristic having cutoff frequencies above 600 Hz and below 3000 Hz. Consequently, only the data frequencies f remain. As previously mentioned, frequency shifts $s$ + phase jitter $\phi(t)$ affect all frequencies uniformly. Thus, the signal at node 1' is $f + s + K\Delta\phi(t)$, where K is a constant.

A digital element 17*a*, *b*, *c* is used to delay the data frequencies in time and phase. This is instrumented by digitizing the waveform with a delta coder 17a described, for example in "Modulation, Spectra, and Noise" by Panter, New York, McGraw-Hill Book Company, 1965.

The digitzed signals are progressively shifted through a shift register 17b incurring thereby a $\tau$ second delay. Also incurred is a phase shift of $\phi$ radians with respect to the undigitized signal. $\Delta$ decoder 17*c* integrates the digits to reconstitute the analog signal. The signal at node D becomes then $f + s + K_1\Delta\phi(t-\tau) + K_2\phi$. Since the jitter component is time dependent, the effect is observed as $\Delta\phi(t-\tau)$. The terms $K_1$ and $K_2$ are constants of proportionality to permit these terms to be represented as frequency components.

Demodulator 18 forms a difference frequency between the data frequency term and the demodulation (carrier) frequency term. Low pass filter 23 is tuned to the difference frequency. The difference prospectively would cancel the unwanted components from the data frequency.

Referring to node 1, the entire signal spectrum is applied simultaneously to switched filter 100 and modulator 108. Filter 100 is tuned to the harmonically related higher pilot frequency $f_2$. The filter bandwidth is sufficiently broad to pass the components $s$ and $\Delta\phi(t)$. This results in the signal $f_2 + s + K\Delta\phi(t)$. If the demodulation frequency were formed by merely adding the pilot frequencies $f_1$ and $f_2$, then this would result in the following expression $f_1 + f_2 + 2s + 2K\Delta\phi(t)$. It is necessary to eliminate the jitter and frequency shift from at least one of the pilot frequencies. In this embodiment, a jitter and frequency shift free lower pilot frequency $f_1'$ is obtained for this purpose.

The first step toward obtaining $f_1'$ is by modulating the signal spectrum at modulator 108 by the output of filter 100 and extracting a frequency difference. In this case: $f_2 + s + K\Delta\phi(t) - f_1 + s + K\Delta\phi(t) = f_2 - f_1 = 3000 - 600 = 2400$ Hz. This in turn is divided by $n - 1$ where $f_1' = f_2 - f_1/n-1 = 2400/4 = 600$ Hz.
The jitter free signal in turn modulates $f_2$ at modulator 111 to yield a sum frequency $f_1' + f_2 + s + K\Delta\phi$.

A phase locked oscillator 16 imparts the time $\tau$ and desired phase $\phi$ delay to the sum frequency. Accordingly, this term becomes $f_1' + f_2 + s + K_1\Delta\phi(t-\tau) + K_2\phi$. The oscillator depicted in FIGS. 2 and 4B has three terminals. Terminal A is for the sum or demodulating frequency, terminal C is the input sum frequency, and terminal B has applied to it a signal for synchronizing the phase and time shift with that of the data frequencies.

Figure 3:
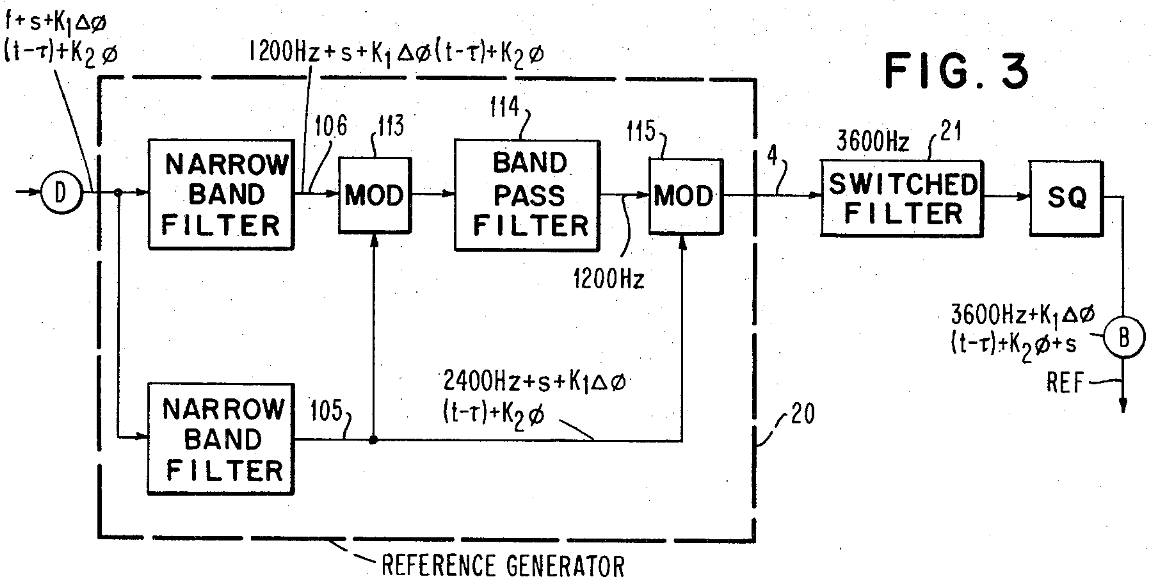
FIG. 3 shows the reference generator 20 of FIG. 2 responsive to the phase and time delayed suppressed carrier modulated signal in the data recovery path for periodically adjusting the phase and time delay of shift and delay element 16 in order to bring the carrier frequency recovered from the pilot tones into exact synchronism with the suppressed carrier modulated signal at the demodulator 18.

Referring now to FIG. 3, there is shown a reference generator which provides the reference or synchronization signal at terminal B for the phase locked oscillator 16 shown in FIG. 2. The reference generator in FIG. 3 takes the data frequency input $f + s + K_1\,\Delta\phi\,(t-\tau) + K_2\phi$ from node D for producing a reference signal 3600 Hz $+ s + K_1\,\Delta\phi\,(t-\tau) + K_2\phi$ as the reference signal applied to the phase oscillator 16 input B. A pair of narrow band filters respectively tuned to 1200 Hz and 2400 Hz extracts the corresponding frequency components from the signal at input D preserving, however, in each case the frequency shifts, phase jitter $K_1\,\Delta\phi\,(t-\tau)$, and phase shift $K_2\phi$ at the respective filter outputs 106 and 105. These components are applied to modulator 113 and band pass filter 114 tuned to the frequency difference of 1200 cycles. In this regard, the output of filter 114 consists of 1200 Hz which is both frequency and phase shift free as well as being jitter free. Modulator 115 together with switched filter 21 tuned to 3600 Hz extracts a sum signal of 3600 Hz $+ s + K_1\,\Delta\phi\,(t-\tau) + K_2\phi$.

Figure 4:
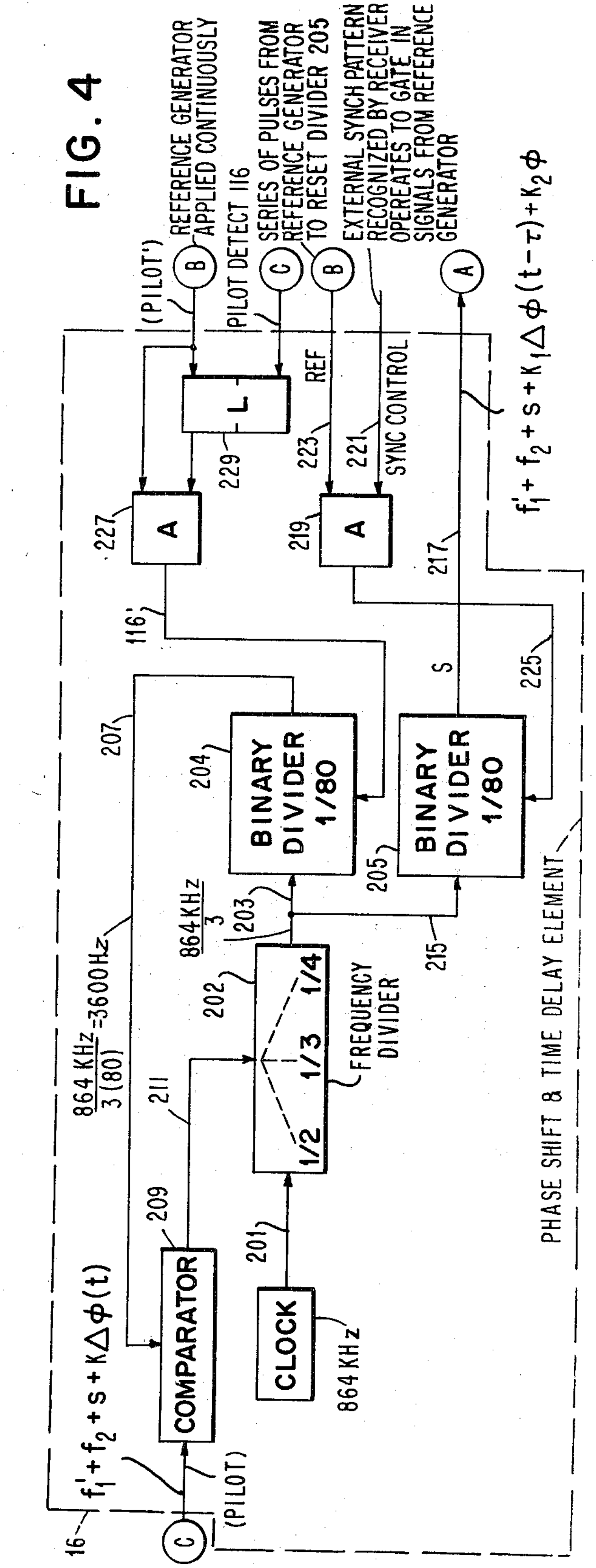
FIG. 4 illustrates the phase shift and time delay element 16 used in the carrier recovery path of FIG. 2.

Referring now to FIG. 4A, there is shown a phase shift and time delay element 16 for synchronizing the phase and time relationship between the carrier frequency and related transmission imparments in the carrier recovery path and the suppressed carrier modulated signal and related transmission impairment in the data recovery path of the FIG. 2 embodiment. The element comprises a clock oscillating at 864 kilohertz driving a frequency divider 202 over path 201. In order to perform both the functions of synchronization and imposing phase shift and time delay upon the recovered carrier as applied to the element at node C, a re-entrant path or loop formed by frequency divider 202, line 203, resettable binary divider 204, path 207, comparator 209, and path 211, provides the necessary speed changing (buffering) mechanism. Since $f_1$ ' and $f_2$ approximate 3600 Hz, the output of the clock at 864 KHz must be divided down. This is accomplished by frequency divider 202 reducing 864/3 KHz and by binary divider 204 further reducing the quotient by 864/3(80) KHz = 3600 Hz. The output of divider 202 is phase adjusted by an amount proportional to the phase shift delayed time difference between the signal applied at node C and the signal on path 207. Note that the signal on path 207 is synchronized to the output from reference generator 20 applied at node B through AND gate 227 to binary divider 204 over path 116.

The signal applied at node C is $f_1' + f_2 + S + K\Delta\phi(t)$. The signal from reference generator 20 at node B is $f_1 + f_2 + S + K_1\Delta\phi(t-\tau) + K_2\phi$. It differs from the node c signal in three particulars, i.e., $f_1$ instead of $f_1'$, $K_1\Delta\phi(t-\tau)$ rather than $K\Delta\phi(t)$, and a constant frequency term caused by phase shift $K_2\phi$. It should be recalled that $f_1' = f_2 - f_1/n-1 = f_2 - f_1/4 = 3600-600/4 = 600$ Hz. However, $f_1'$ as derived in the carrier recovery path lacks the frequency shift S and frequency sensitive term $K\Delta\phi(t)$. The frequency $f_1'$ was derived in order to maintain the shifts in both the data and carrier recovery paths identical.

Binary divider 204 is phase locked with the (pilot' 3600 Hz + S) signal from reference generator 20, which signal is applied continuously to the divider through latch 229, AND gate 227, and path 116'. The nominal 3600 Hz signal from divider 204 is applied to comparator 209 over path 207. The frequency of carrier (pilot), applied as the other comparator 209 input at node C, is in the instantaneous sense either slightly less than or slightly exceeds the frequency of the signal on path 207. The comparator in response thereto provides a magnitude varying as the frequency difference varies to frequency divider 202.

Frequency divider 202 nominally divides the clock by 1/3, i.e., 864/3 KHZ = 288 KHz. If the comparator output indicates that the carrier frequency is less than the other (reference frequency), then divider 202 reduces the reference frequency by about 15 Hz only for the duration of one cycle (1/3600 Hz). This is obtained by dividing 864 KHz by 4, i.e., 864/3 KHz = 218 KHz for one cycle. If the carrier frequency is higher than the reference, then the reference frequency is increased by about 15 Hz also only for the duration of one cycle (1/3600 Hz). In this case, the clock frequency is divided by 4, i.e., 864/4 KHz = 432 KHz for one cycle. Nevertheless, the binary divider 204 still continues to be phase locked to the pilot'.

Binary divider 205 is driven by frequency divider 202 in parallel with divider 204 over path 215. It likewise divides the nominal 864/3 KHz by 80. The output of divider 205 is applied to demodulator 18 over path 217. This divider need be synchronized only upon the receiver being initialized. Accordingly, if signals from the reference generator are applied during the time when a synchronization pattern is applied to the receiver, then the divider can be appropriately reset over path 223, AND gate 219, and path 215. This is assured by provision of AND gate 219 being enabled only upon the external synch being applied to path 221.

This description of the present invention has been given as an example and it will be understood that various changes in form and details may be made therein without departing from the spirit and scope of the invention.

What is claimed is:

1. In a receiver of phase modulated signals in which each signal as received has its spectral components frequency shifted by s hertz and phase jitter time modulated by $\Delta\phi(t)$ radians, the spectrum including harmonically related pilot frequencies $f_1$ and $f_2$ lying outside the data frequency band $f$, where $f_2 = nf_1$, and wherein the improvement comprises:

- a first signal processing path responsive to the received data frequency band $f + s + K\Delta\phi(t)$, K being a constant, for respectively time and phase delaying each frequency by $\tau$ seconds and $\phi$ radians whereby the data band becomes $f + s + K_1\Delta\phi(t-\tau) + K_2\phi$, $K_1$ and $K_2$ being constants.
- a second signal processing path for extracting a demodulation frequency $f_1' + f_2 + s + K_1\Delta\phi(t-\tau) + K_2\phi$ from each received signal spectrum where $f_1' = f_2 - f_1/n-1$; and
- means for demodulating the first path spectral output by the demodulation frequency thereby subtractively eliminating the frequency shift and phase jitter components.

2. In a receiver according to claim 1, wherein the second signal processing path includes:

- means for forming a jitter free frequency $f_1'$ according to the relation $$f_1' = [f_2 + s + K\Delta\phi(t) - f_1 + s + K\Delta\phi(t);]/(n-1)$$

- means for forming the demodulation frequency $f_1' + f_2 + s + K\Delta\phi(t)$; and
- means for time and phase delaying the demodulation frequency by $\tau$ seconds and $\phi$ radians whereby the frequency becomes $f_1' + f_2 + s + K_1\Delta\phi(t-\tau) + K_2\phi$.

3. In a receiver according to claim 2, wherein the means for forming the jitter free frequency $f_1'$ include:

- a first switched filter responsive to each received signal spectrum for extracting the pilot frequency $f_2 + s + K\Delta\phi(t)$;
- means for modulating the received signal spectrum with the extracted pilot frequency for obtaining the difference frequency $f_2 - f_1$; and
- counting means for dividing the difference frequency by $n-1$.

4. In a receiver according to claim 2, wherein the time and phase delaying means include:

- a phase locked oscillator with a phase shifter.

5. In a receiver according to claim 1, wherein the first signal processing path includes:

- a pilot frequency rejection filter for passing each data frequency band $f + s + K\Delta\phi(t)$;
- a delta coder for digitizing the filtered signal;
- a shift register imposing a $\tau$ second delay on the digitized signal; and
- a delta decoder for recombining the delayed digits into an analog signal.

6. In a receiver of phase modulated signals in which each signal as received has its spectral components frequency shifted and phase jitter time modulated, the spectrum includes a pair of harmonically related pilot frequencies lying outside the data frequency band, wherein the improvement comprises:

- a first signal processing path for time and phase delaying by predetermined amounts the frequency shifted and jitter modulated data frequency band;
- a second signal processing path for extracting a demodulation frequency from each signal equal to the sum of the pilot frequencies, said demodulation frequency being frequency shifted, jitter modulated, time and phase delayed by an amount matching that of the first signal path; and
- means for demodulating the data frequency band by the demodulation frequency thereby subtractively eliminating the frequency shift and phase jitter components.

7. In a receiver according to claim 6, wherein the second path includes:

means for forming a frequency shift free and jitter free low pilot frequency;

means for combining the low pilot frequency with the high pilot frequency, whereby the combined frequency exhibits only the same frequency shift and phase jitter as that attributed to the data frequency band; and means for adjusting the time and phase delay of the combined frequency to match that of the data frequency band.

* * * * *